(12) United States Patent
Zhou

(10) Patent No.: US 11,435,841 B2
(45) Date of Patent: Sep. 6, 2022

(54) TOUCH DISPLAY DEVICE AND MANUFACTURING METHOD THEREOF

(71) Applicant: SHENZHEN CHINA STAR OPTOELECTRONICS SEMICONDUCTOR DISPLAY TECHNOLOGY CO., LTD., Guangdong (CN)

(72) Inventor: Mingjun Zhou, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/620,197

(22) PCT Filed: Nov. 4, 2019

(86) PCT No.: PCT/CN2019/115388
§ 371 (c)(1),
(2) Date: Dec. 6, 2019

(87) PCT Pub. No.: WO2021/012455
PCT Pub. Date: Jan. 28, 2021

(65) Prior Publication Data
US 2021/0333901 A1    Oct. 28, 2021

(30) Foreign Application Priority Data

Jul. 25, 2019  (CN) .......................... 201910675243.8

(51) Int. Cl.
*G06F 3/041* (2006.01)
*C09J 7/38* (2018.01)
(Continued)

(52) U.S. Cl.
CPC .............. *G06F 3/041* (2013.01); *B32B 7/023* (2019.01); *B32B 7/12* (2013.01); *B32B 27/36* (2013.01);
(Continued)

(58) Field of Classification Search
None
See application file for complete search history.

(56) References Cited

U.S. PATENT DOCUMENTS 9,423,830 B1 * 8/2016 Wei .................. B29D 11/00663
2007/0268201 A1   11/2007 Sampsell et al.
(Continued)

FOREIGN PATENT DOCUMENTS

CN   102999200 A    3/2013
CN   103455187 A   12/2013
(Continued)

*Primary Examiner* — Matthew Yeung

(57) ABSTRACT

A touch display device and a method of manufacturing the touch display device are disclosed. With a first shielding layer disposed between a touch panel and a sealant or disposed on a side of a protection cover away from a touch display for shielding internal lines on a frame of a touch display module, the present application not only allows an ultraviolet curable adhesive for formation of the sealant to be sufficiently cured, but also let the internal lines on the frame of the touch display module be shielded.

16 Claims, 4 Drawing Sheets

(51) Int. Cl.
  *B32B 7/023*  (2019.01)
  *B32B 7/12*   (2006.01)
  *B32B 27/36*  (2006.01)
  *C09J 5/00*   (2006.01)

(52) U.S. Cl.
  CPC . *C09J 5/00* (2013.01); *C09J 7/38* (2018.01); *B32B 2255/10* (2013.01); *B32B 2307/584* (2013.01); *B32B 2457/208* (2013.01); *C09J 2203/326* (2013.01); *C09J 2301/416* (2020.08); *G06F 2203/04103* (2013.01); *G06F 2203/04107* (2013.01)

(56) References Cited

U.S. PATENT DOCUMENTS

| | | | |
|---|---|---|---|
| 2013/0069890 | A1 | 3/2013 | Huang et al. |
| 2015/0277626 | A1* | 10/2015 | Shinkai ............ G06F 3/0447 345/174 |
| 2016/0224168 | A1* | 8/2016 | Watanabe ......... G06F 3/0445 |
| 2017/0196108 | A1* | 7/2017 | Inobe .............. H05K 5/0017 |
| 2020/0064971 | A1* | 2/2020 | Suto ................ H05K 3/361 |

FOREIGN PATENT DOCUMENTS

| | | |
|---|---|---|
| CN | 103713768 A | 4/2014 |
| CN | 103970349 A | 8/2014 |
| CN | 204288172 U | 4/2015 |
| CN | 109445645 A | 3/2019 |
| CN | 109597509 A | 4/2019 |
| CN | 110413151 A | 11/2019 |

\* cited by examiner

TOUCH DISPLAY DEVICE AND MANUFACTURING METHOD THEREOF

BACKGROUND OF INVENTION

1. Field of Invention

The present invention relates to a technical field of displays, and particularly to, a touch display device and a manufacturing method thereof.

2. Related Art

At present, in a frame-mounting process of a touch display device, a protection cover is required to be adhered to a touch display module by using an ultraviolet (UV) curable adhesive. In order to allow the UV curable adhesive to be sufficiently cured under ultraviolet light to ensure the adhesion between the protection cover and the touch display module, a position of the protection cover corresponding to the UV curable adhesive cannot be masked with ink. However, the protection cover not covered by the ink may cause internal lines on a frame of the touch display module to be exposed.

Therefore, it is imperative to provide a technical solution to ensure that the internal lines on the frame of the touch display module are shielded while the UV curable adhesive is cured.

SUMMARY OF INVENTION

An object of the present invention is to provide a touch display device and a manufacturing method thereof to ensure that internal lines on a frame of a touch display module are shielded while a photosensitive adhesive is cured.

A touch display device, comprising a touch display module, a protection cover, a sealant, a first shielding layer, and a chamber, wherein the touch display module comprises a touch panel, the sealant is disposed between the touch panel and the protection cover for bonding the touch panel and the protection cover, and the chamber is enclosed by the sealant, the touch panel, and the protection cover; wherein the first shielding layer is disposed between the touch panel and the sealant, or the first shielding layer is disposed on a side of the protection cover away from the touch panel for shielding internal lines on a frame of the touch display module.

In the touch display device, the first shielding layer is disposed on a surface of the protection cover away from a surface of the touch panel.

In the touch display device, the touch display device further comprises an anti-glare film disposed on the side of the protection cover away from the touch panel.

In the touch display device, the first shielding layer is disposed between the anti-glare film and the protection cover, and is formed on a surface of at least one of the anti-glare film and the protection cover.

In the touch display device, the first shielding layer has a frame-like shape, and an orthographic projection of the sealant on the protection cover is within an area of an orthographic projection of the first shielding layer on the protection cover.

In the touch display device, the first shielding layer is disposed on a surface of the anti-glare film away from the protection cover.

In the touch display device, the chamber is a vacuum chamber, and the protection cover is recessed into the chamber from where the protection cover corresponds to the chamber.

In the touch display device, the touch display device further comprises a first anti-rainbow stripes layer disposed between the touch panel and the protection cover.

In the touch display device, the first anti-rainbow stripes layer is disposed between the sealant and the touch panel, and the first shielding layer is disposed between the sealant and the first anti-rainbow stripes.

In the touch display device, the touch display device further comprises a second anti-rainbow stripes layer disposed on the side of the protection cover away from the touch panel.

A method of manufacturing a touch display device, comprising providing a touch display module, a protection cover, and an ultraviolet curable adhesive, wherein the touch display module comprises a touch panel; forming, by applying the ultraviolet curable adhesive to one of the touch panel and the protection cover, a frame-shaped ultraviolet curable adhesive, and bonding another one of the touch panel and the protection cover to the frame-shaped ultraviolet curable adhesive; forming, by irradiating the frame-shaped ultraviolet curable adhesive from a side of the protection cover with ultraviolet light, a sealant; and forming a first shielding layer on a side of the protection cover away from the touch panel to shield internal lines on a frame of the touch display module.

In the method of manufacturing the touch display device, the forming a first shielding layer on a side of the protection cover away from the touch panel comprises a step as follows: forming the first shielding layer on a surface of the protection cover away from the touch panel.

In the method of manufacturing the touch display device, the manufacturing method further comprises disposing an anti-glare film on the side of the protection cover away from the touch panel.

In the method of manufacturing the touch display device, the forming a first shielding layer on a side of the protection cover away from the touch panel comprises a step as follows: forming the first shielding layer between the anti-glare film and the protection cover.

In the method of manufacturing the touch display device, the first shielding layer has a frame-like shape, and an orthographic projection of the sealant on the protection cover is within an area of an orthographic projection of the first shielding layer on the protection cover.

In the method of manufacturing the touch display device, the forming a first shielding layer on a side of the protection cover away from the touch panel comprises a step as follows: forming the first shielding layer on a surface of the anti-glare film away from the protection cover.

In the method of manufacturing the touch display device, the forming, by irradiating the frame-shaped ultraviolet curable adhesive from a side of the protection cover with ultraviolet light, a sealant is implemented under a vacuum condition, wherein a vacuum chamber is formed and enclosed by the sealant, the touch panel, and the protection cover, and the protection cover is recessed into the chamber from where the protection cover corresponds to the chamber.

In the method of manufacturing the touch display device, the manufacturing method further comprises disposing a first anti-rainbow stripes layer between the touch panel and the protection cover.

In the method of manufacturing the touch display device, the manufacturing method further comprises disposing a second anti-rainbow stripes layer on the side of the protection cover away from the touch panel.

A method of manufacturing a touch display device, comprising providing a touch display module, a protection cover, and an ultraviolet curable adhesive, wherein the touch display module comprises a touch panel; forming a first shielding layer on a side of the touch panel to be bonded to the protection cover to shield internal lines on a frame of the touch display module; forming, by applying the ultraviolet curable adhesive to a side of one of the touch panel and the protection cover, a frame-shaped ultraviolet curable adhesive, and bonding another one of the touch panel and the protection cover to the frame-shaped ultraviolet curable adhesive; and forming, by irradiating the frame-shaped ultraviolet curable adhesive from a side of the protection cover with ultraviolet light, a sealant.

The present application provides a touch display device and a manufacturing method thereof. With a first shielding layer disposed between a touch panel and a sealant or disposed on a side of a protection cover away from a touch display for shielding internal lines on a frame of a touch display module, the present application not only allows an ultraviolet curable adhesive for formation of the sealant to be sufficiently cured, but also let the internal lines on the frame of the touch display module be shielded.

DESCRIPTION OF PREFERRED EMBODIMENTS

The technical solutions in the embodiments of the present application will be clearly and completely described in the following with reference to the accompanying drawings in the embodiments. Apparently, the embodiments as described are only a part, but not all, of the embodiments of the present application. Based on the embodiments in the present application, all other embodiments obtained by those skilled in the art without creative efforts shall be within the scope of the present application.

Figure 1:
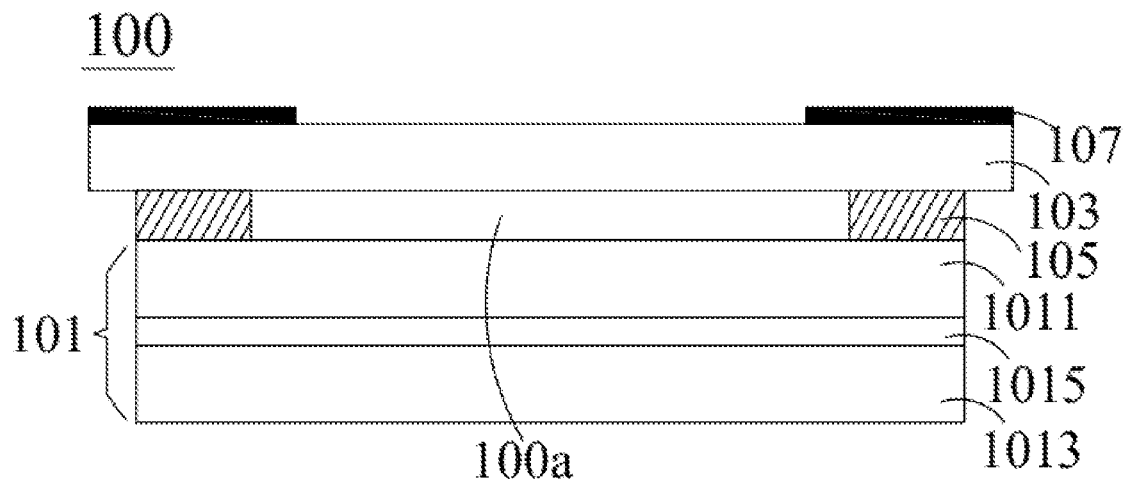
FIG. 1 is a schematic structural view of a touch display device of a first embodiment of the present application.

Please refer to FIG. 1 showing a schematic structural view of a touch display device of a first embodiment of the present application. The touch display device 100 includes a touch display module 101, a protection cover 103, a sealant 105, a first shielding layer 107, and a chamber 100a.

The touch display module 101 includes a touch panel 1011, a display panel 1013, and an adhesive film layer 1015 disposed between the touch panel 1011 and the display panel 1013. The touch panel 1011 may include one of a capacitive touch component, a resistive touch component, an acoustic touch component, a mechanical touch component, and an optical touch component. In this embodiment, the touch panel 1011 includes the capacitive touch component. The display panel 1013 is a liquid crystal display panel or an organic light-emitting diode display panel. The adhesive film layer 1015 is adhered to the touch panel 1011 and the display panel 1013 in a comprehensive manner. The adhesive film layer 1015 is an optical transparent adhesive layer.

The protection cover 103 is configured to protect the touch display module 101. The protection cover 103 is a transparent glass plate. An orthographic projection of the touch display module 101 on the protection cover 103 is within the protection cover 103, that is, the protection cover 103 has a size greater than that of the touch display module 101.

The sealant 105 is disposed between the touch panel 1011 and the protection cover 103 for bonding the touch panel 1011 and the protection cover 103. The sealant 105 has a frame-like shape, that is, a middle of the sealant 105 is hollow. The sealant 105 is formed by applying an ultraviolet curable adhesive to one of the touch panel 1011 and the protection cover 103, and bonding another one to the ultraviolet curable adhesive, and is cured by ultraviolet light.

The first shielding layer 107 is disposed on a side of the protection cover 103 away from the touch panel 1011. Specifically, the first shielding layer 107 is disposed on a surface of the protection cover 103 away from the touch panel 1011. After the formation of the sealant 105, that is, after the ultraviolet curable adhesive is cured with ultraviolet light, the first shielding layer 107 is formed on the surface of the protection cover 103 away from the touch panel 1011 for shielding internal lines (not shown) on a frame of the touch display module 101. By disposing the first shielding layer 107 after the ultraviolet curable adhesive is cured to form the sealant 105, the ultraviolet curable adhesive can be ensured to be cured under the transparent protection cover 103, thereby to not only allow the sealant bonding the protection cover 103 and the touch panel 1011 together to be formed by sufficiently curing of the ultraviolet curable adhesive, but also let the first shielding layer 107 shield the internal lines on the frame of the touch display module 101. The first shielding layer 107 is an ink layer. The first shielding layer 107 is formed using screen printing.

The first shielding layer 107 is frame-like in shape. An orthographic projection of the sealant 105 on the protection cover 103 and is within an area of an orthographic projection of the first shielding layer 107 on the protection cover 103. A peripheral edge of the first shielding layer 107 is flush with a peripheral edge of the protection cover 103.

The chamber 100a is filled with air. The chamber 100a is formed and enclosed by the sealant 105, the touch panel 1011, and the protection cover 103.

Figure 2:
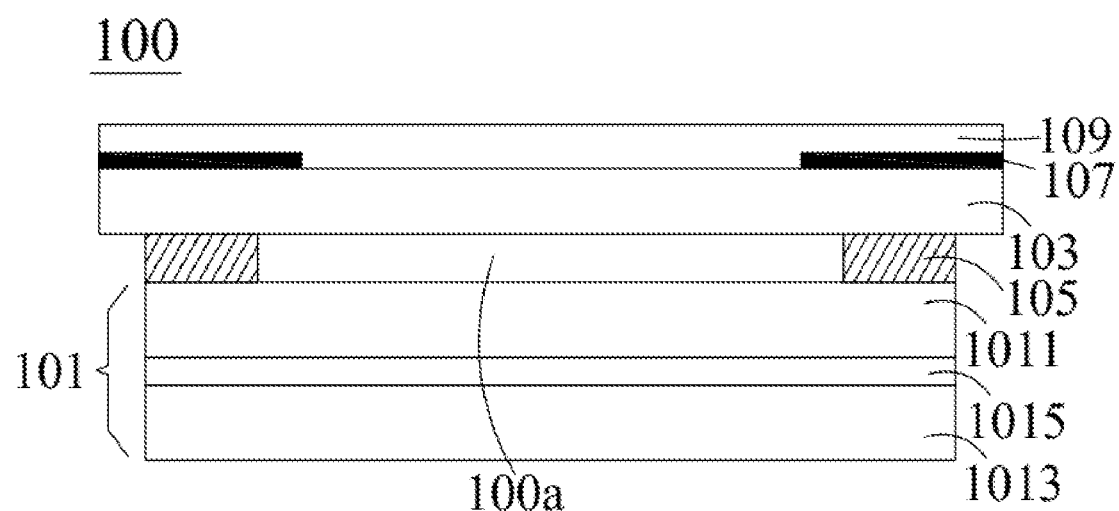
FIG. 2 is a schematic structural view of a touch display device of a first aspect of a second embodiment of the present application.

Please refer to FIG. 2 showing a schematic structural view of a touch display device of a first aspect of a second embodiment of the present application. The touch display device 100 of FIG. 2 is substantially similar to the touch display device 100 of FIG. 1, except that the touch display device 100 further includes an anti-glare film (AG film) 109. The anti-glare film 190 is disposed on a side of the protection cover 103 away from the touch panel 1011. The anti-glare film 109 functions to prevent glare and reflection, and greatly enhances eye comfort of viewing the touch display device 100. The anti-glare film 109 is an anti-glare film. The anti-glare film 109 includes a polymer substrate and scattering particles coated on the polymer substrate. The polymer substrate is made of polyethylene terephthalate (PET).

Specifically, the first shielding layer 107 is disposed between the anti-glare film 109 and the protection cover 103. The first shielding layer 107 is formed on a surface of at least one of the anti-glare film 109 and the protection cover 103. The first shielding layer 107 may be formed using screen printing on the protection cover 103 after the sealant 105 is formed. The anti-glare film 109 attached with the first shielding layer 107 may be adhered to the protection cover 103 after the sealant 105 is formed, so that the first shielding layer 107 is formed between the anti-glare film 109 and the protection cover 103.

In comparison with the touch display device 100 as shown in FIG. 1, the touch display device 100 as shown in FIG. 2 can further improve the eye comfort when using the touch display device 100, and at the same time can avoid damage to the first shielding layer 107, as well as prevent internal lines from being seen due to harm to the first shielding layer 107 during the use of the touch display device 100.

Figure 3:
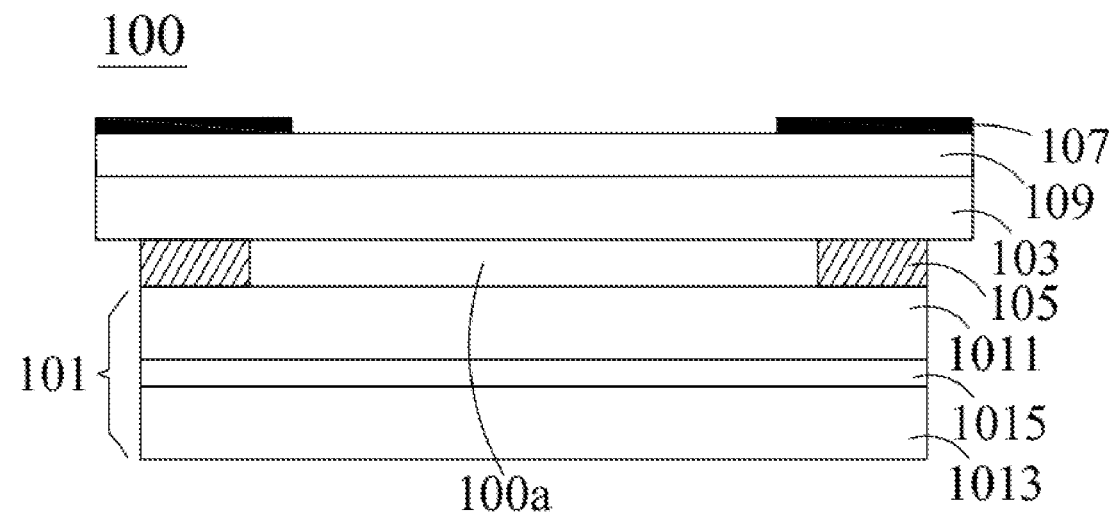
FIG. 3 is a schematic structural view of a touch display device of a second aspect of the second embodiment of the present application.

Please refer to FIG. 3 showing a schematic structural view of a touch display device of a second aspect of the second embodiment of the present application. The touch display device 100 of FIG. 3 is substantially similar to the touch display device 100 of FIG. 2, except that the first shielding layer 107 is disposed on a surface of the anti-glare film 109 away from the protection cover 103. After the sealant 105 is formed, the anti-glare film 109 is adhered to a surface of the protection cover 103 away from the touch panel 1011, and then the first shielding layer 107 is formed on the anti-glare film 109. Alternatively, the anti-glare film 109 attached with the first shielding layer 107 is adhered to the surface of the protection cover 103 away from the touch panel 1011, so that the first shielding layer 107 is disposed on the surface of the anti-glare film 109 away from the protection cover 103.

Figure 4:
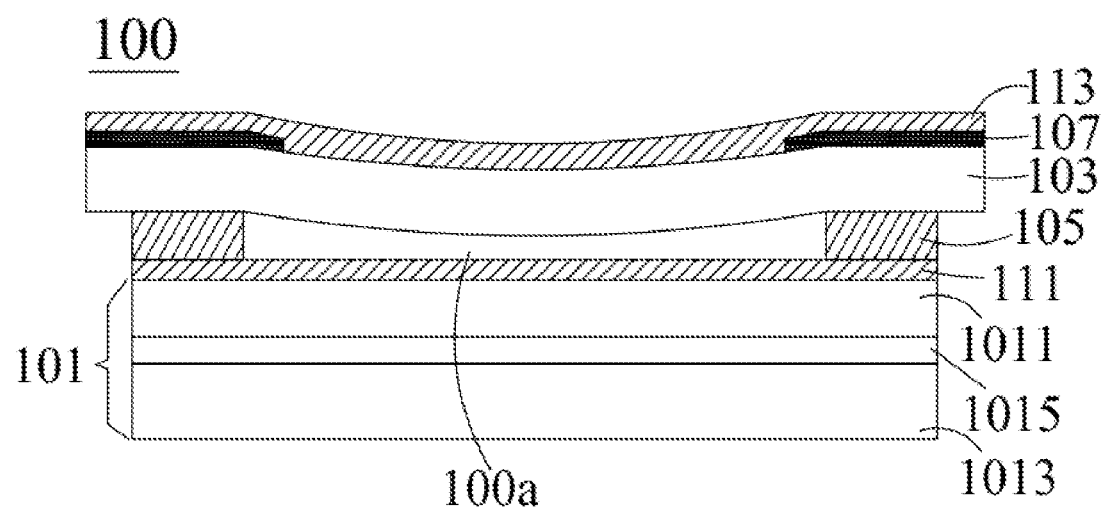
FIG. 4 is a schematic structural view of a touch display device of a first aspect of a third embodiment of the present application.

Please refer to FIG. 4 showing a schematic structural view of a touch display device of a first aspect of a third embodiment of the present application. The touch display device 100 of FIG. 4 is substantially similar to the touch display device 100 of FIG. 1, except that a chamber 100a is a vacuum chamber. The protection cover 103 is recessed into the chamber 100a from where the protection cover corresponds to the chamber, reducing a space of the chamber 100a, thereby improving users' touch feeling about the touch display device 100. The chamber 100a in cooperation with sealing property of the sealant 105 can further prevent dust, water vapor, and the like from entering the chamber 100a.

The touch display device 100 further includes a first anti-rainbow stripes layer 111 disposed between the touch panel 1011 and the protection cover 103. Specifically, the first anti-rainbow stripes layer 111 is disposed between the sealant 105 and the touch panel 1011. The first anti-rainbow stripes layer 111 covers an entire surface of the touch panel 1011. The first anti-rainbow stripes layer 111 may include a polymer substrate and scattering particles coated on the polymer substrate. The first anti-rainbow stripes layer 111 may also be formed by forming protrusions or/and grooves on the polymer substrate.

Since the protection cover 103 is partially recessed into the chamber 100a, the touch display device 100 may be interfered with by light, so that rainbow stripes occur when the touch display device 100 is displayed.

Furthermore, the touch display device further includes a second anti-rainbow stripes layer 113 disposed on aside of the protection cover 103 away from the touch panel 1011. The second anti-rainbow stripes layer 113 covers the protection cover 103 and the first shielding layer 107. The second anti-rainbow stripes layer 113 and the first anti-rainbow stripes layer 111 function together to prevent occurrence of the rainbow stripes as the touch display device 100 is displayed. The second anti-rainbow stripes layer 113 and the first anti-rainbow stripes layer 111 may be made of a same or different material.

It should be noted that the second anti-rainbow stripes layer 113 of this embodiment and the anti-glare film 109 of the second embodiment are made of a same material. In this embodiment, since the chamber 100a is a vacuum chamber, the second anti-rainbow stirpes layer 113 can function to prevent not only appearance of rainbow stripes, but also occurrence of glare at the same time. In the second embodiment, the chamber 100a is filled with air, and the anti-glare film 109 mainly functions to prevent occurrence of glare. Furthermore, when each of the second anti-rainbow stirpes layer 113 and the anti-glare film 109 is coated with a polymer film containing scattering particles, a feeling of a finger touch on the touch display device 100 can be improved.

Figure 5:
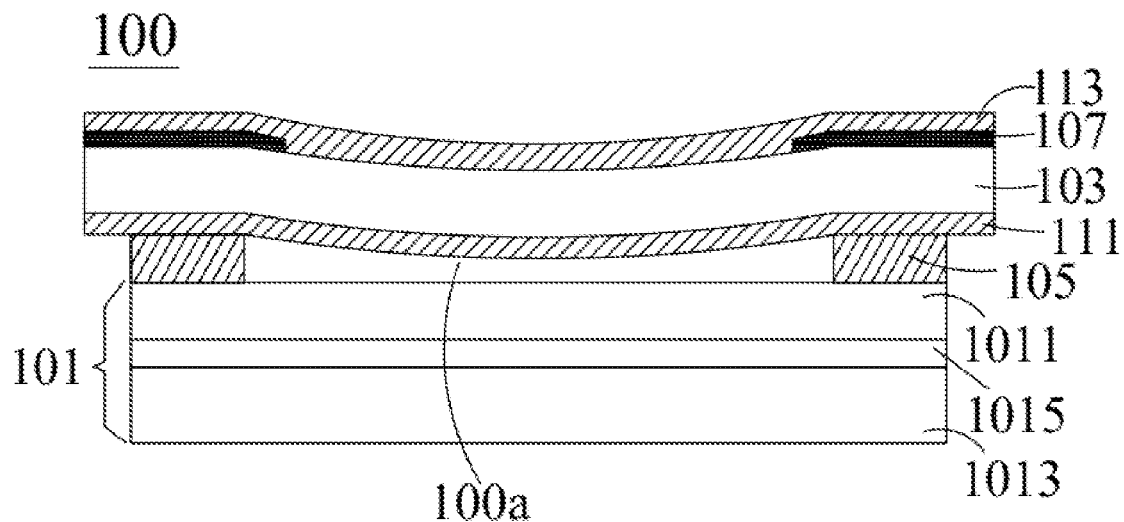
FIG. 5 is a schematic structural view of a touch display device of a second aspect of the third embodiment of the present application.

Please refer to FIG. 5 showing a schematic structural view of a touch display device of a second aspect of the third embodiment of the present application. The touch display device 100 of FIG. 5 is substantially similar to the touch display device 100 of FIG. 4, except that the first anti-rainbow stripes layer 111 is disposed between the sealant 105 and the protection cover 103.

In this embodiment, the first anti-rainbow stripes layer 111 may be formed by spraying scattering particles on the protection cover 103, or may roughen the protection cover 103 by chemical methods (such as chemical etching) or physical methods (mechanical blasting) to protect the protection cover 103, thereby to form a microstructure having a scattering function on the protection cover 103. That is, the first anti-rainbow stripes layer 111 may be formed by treatment of a surface of the protection cover 103. The first anti-rainbow stripes layer 111 may include a polymer substrate and scattering particles coated on the polymer substrate.

Figure 6:
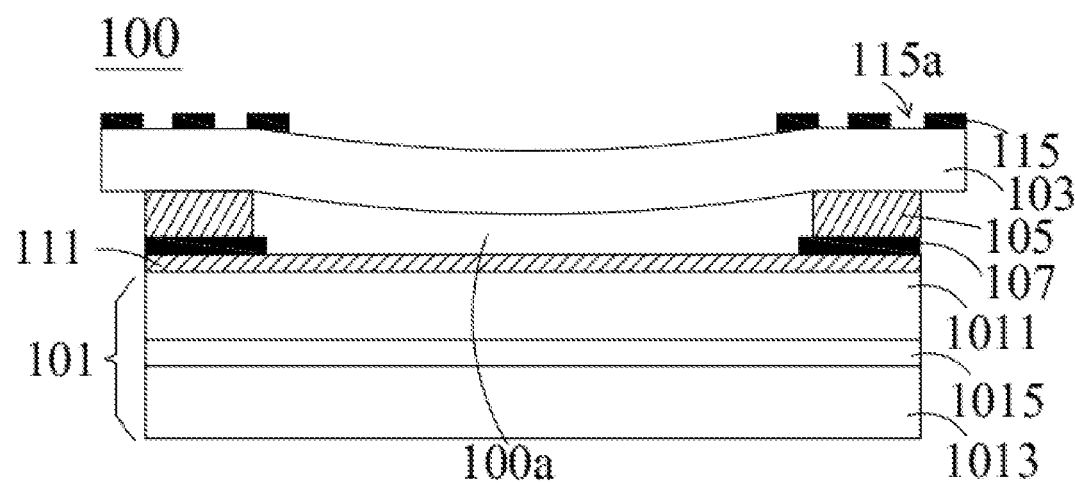
FIG. 6 is a schematic structure view of a touch display panel of a fourth embodiment of the present application.

Please refer to FIG. 6 showing a schematic structure view of a touch display panel of a fourth embodiment of the present application. The touch display device 100 as shown in FIG. 6 includes a touch display module 101, a protection cover 103, a sealant 105, a first shielding layer 107, a chamber 100a, and a first anti-rainbow stripes layer 111.

The touch display module 101, the protection cover 103, and the sealant 105 are the same as those in the first embodiment, and are not described in detail herein. The chamber 100a is a vacuum chamber. The first anti-rainbow stripes layer 111 is disposed between the sealant 105 and the touch panel 1011, and the first shielding layer 107 is disposed between the sealant 105 and the first anti-rainbow stripes layer 111. Based on the first shielding layer 107 disposed between the sealant 105 and the first anti-rainbow stripes layer 111, the first shielding layer 107 can function to shield internal lines on the frame of the touch display module.

Furthermore, the touch display device 100 further includes a second shielding layer 115 having a light-transmissive area 115a. The second shielding layer 115 having a light-transmissive area 115a is formed by a printing process on a surface of the protection cover 103 close to the touch panel 1011 or away from the touch panel 1011. The second shielding layer 115 may be formed before the ultraviolet curable adhesive is cured. Since the light-transmissive area 115a is provided, the ultraviolet curable adhesive can be sufficiently cured by adjusting density and an overall area of the light-transmissive area 115a. The second shielding layer 115 may be formed after the ultraviolet curable adhesive is cured, so the ultraviolet curable adhesive can be fully cured. The second shielding layer 115 and the first shielding layer 107 cooperate with each other to shield an entire outer frame of the touch display device.

Figure 7:
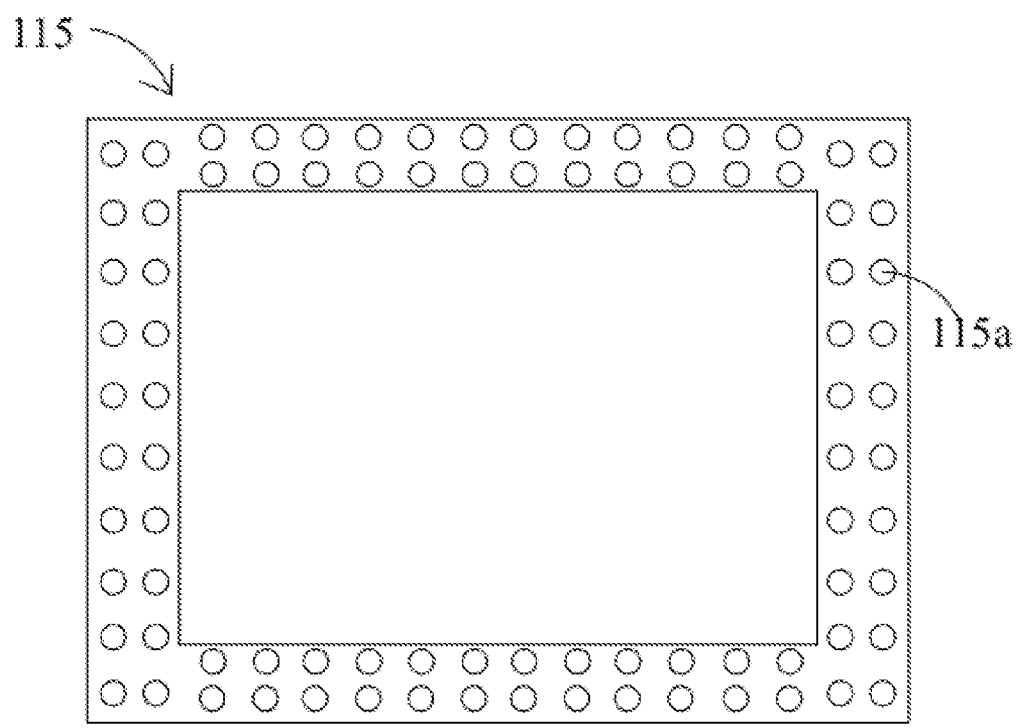
FIG. 7 is a schematic top plan view of a second shielding layer having a light-transmissive area in the touch display panel of FIG. 6.

As shown in FIG. 7, it is a schematic top plan view of the second shielding layer 115 having the light-transmissive area 115a in the touch display panel of FIG. 6. A plurality of light-transmissive areas 115a each are round in shape. The light-transmissive areas 115a are evenly distributed on the second shielding layer 115. With the second shielding layer 115 having the light-transmissive areas 115a disposed on a surface of the protection cover 103, when curing with ultraviolet, part of ultraviolet passes through the protection cover 103 to cure the ultraviolet curable adhesive, so that the sealant 105 is formed to bond the protection cover 103 and the touch panel 1011. The second shielding layer 115 having the light-transmissive areas 115a cooperate with the first shielding layer 107 to shield an outer contour of the touch display device 100.

The present application further provides method of manufacturing a touch display device, comprising steps as follows:

S11: providing a touch display module, a protection cover, and an ultraviolet curable adhesive, wherein the touch display module includes a touch panel.

Specifically, the touch display module includes a touch panel, a display panel, and an adhesive film layer for bonding the touch panel and the display panel. The protection cover is a transparent glass plate. The ultraviolet curable adhesive is an adhesive cured under ultraviolet light.

S12: forming a frame-shaped ultraviolet curable adhesive by applying the ultraviolet curable adhesive to one of the touch panel and the protection cover, and bonding another one of the touch panel and the protection cover to the frame-shaped ultraviolet curable adhesive.

Specifically, a surface of the touch panel to be attached with the protection cover is coated with the ultraviolet curable adhesive, and then the protection cover is attached to the frame-shaped ultraviolet curable adhesive.

S13: forming a sealant by irradiating the frame-shaped ultraviolet curable adhesive with ultraviolet light from a side of the protection cover.

Specifically, when using ultraviolet light to irradiate the frame-shaped ultraviolet curable adhesive through the protection cover, since the protection cover is transparent, the frame-shaped ultraviolet curable adhesive can be sufficiently cured to ensure bonding strength and sealing between the protection cover and the touch panel.

Furthermore, the step of forming the sealant by irradiating the frame-shaped ultraviolet curable adhesive from the side of the protection cover with ultraviolet light is implemented under a vacuum condition, wherein a vacuum chamber is formed and enclosed by the sealant, the touch panel, and the protection cover. The protection cover is recessed into the chamber from where the protection cover corresponds to the chamber.

S14: forming a first shielding layer on a side of the protection cover away from the touch panel to shield internal lines on a frame of the touch display module.

Specifically, the first shielding layer is formed on a surface of the protection cover away from the touch panel. Forming the first shielding layer on the surface of the protection cover away from the touch panel by screen printing. The first shielding layer is frame-like in shape. An orthographic projection of the sealant on the protection cover is within an area of an orthographic projection of the first shielding layer on the protection cover. The first shielding layer is a frame type ink, which functions to shield internal lines on a frame of the touch display module.

Furthermore, the manufacturing method further includes: disposing an anti-glare film on the side of the protection cover away from the touch panel.

Moreover, the step of forming the first shielding layer on the side of the protection cover away from the touch panel includes a step as follows: forming the first shielding layer between the anti-glare film and the protection cover, or forming the first shielding layer on a surface of the anti-glare film away from the protection cover.

Furthermore, the manufacturing method further includes: disposing a first anti-rainbow stripes layer between the touch panel and the protection cover.

Moreover, the manufacturing method further includes: disposing a second anti-rainbow stripes layer on the side of the protection cover away from the touch panel.

Based on the method of manufacturing the touch display device of the embodiments of the present application, the first shielding layer for shielding internal lines on the frame of the touch display module is formed on the side of the protection cover away from the touch panel after the sealant is formed by curing of the ultraviolet curable adhesive, thereby to ensure that the internal lines on the frame of the touch display module can be shielded while the ultraviolet curable adhesive for formation of the sealant is sufficiently cured.

The present application further provides another method of manufacturing a touch display device. The manufacturing method includes steps as follows:

S21: providing a touch display module, a protection cover, and an ultraviolet curable adhesive, wherein the touch display module includes a touch panel.

Specifically, the touch display module includes a touch panel, a display panel, and an adhesive film layer for bonding the touch panel and the display panel. The protection cover is a transparent glass plate. The ultraviolet curable adhesive is an adhesive cured under ultraviolet light.

S22: forming a first shielding layer on a side of the touch panel to be bonded to the protection cover to shield internal lines on a frame of the touch display module.

Specifically, attaching an anti-rainbow stripes layer on a surface of the side of the touch panel to be bonded to the protection cover using an adhesive, wherein the anti-rainbow stripes layer includes a polyethylene terephthalate substrate and scattering particles formed on the polyethylene terephthalate substrate. The first shielding layer is a frame type ink, which functions to shield the internal lines on the frame of the touch display module.

S23: forming a frame-shaped ultraviolet curable adhesive by applying the ultraviolet curable adhesive to a side of one of the protection cover and the touch panel, and bonding another one of the protection cover and the touch panel to the frame-shaped ultraviolet curable adhesive.

Specifically, after the step S22, the frame-shaped ultraviolet curable adhesive is formed by applying the ultraviolet curable adhesive on the first shielding layer, and then the protection cover is attached to the frame-shaped ultraviolet curable adhesive.

S24: forming a sealant by irradiating the frame-shaped ultraviolet curable adhesive from a side of the protection cover with ultraviolet light.

Specifically, when using ultraviolet light to irradiate the frame-shaped ultraviolet curable adhesive through the protection cover, since the protection cover is transparent, the frame-shaped ultraviolet curable adhesive can be sufficiently cured to ensure bonding strength and sealing between the protection cover and the touch panel.

Based on the embodiment of the present application, after the first shielding layer is formed on a side of the touch panel to be bonded to the protection cover for shielding internal lines on a frame of the touch display module, the frame-shaped ultraviolet curable adhesive is formed and cured to form the sealant, thereby to ensure that the first shielding layer functions to shield the internal lines on the frame of the touch display module while the ultraviolet curable adhesive is sufficiently cured.

The description of the above embodiments is only for helping to understand the technical solution of the present application and its core ideas. It should be understood by those skilled in the art that the technical solutions described in the foregoing embodiments may be modified, or some of the technical features may be equivalently replaced; and the modifications or replacements do not make the essence of the corresponding technical solutions deviate from a range of technical solutions of the various embodiments of the present application.

What is claimed is:

1. A touch display device, comprising:
a touch display module, a protection cover, a sealant, a first shielding layer, and a chamber, wherein the touch display module comprises a touch panel, the sealant is disposed between the touch panel and the protection cover for bonding the touch panel and the protection cover, and the chamber is enclosed by the sealant, the touch panel, and the protection cover; and
an anti-glare film disposed on a side of the protection cover away from the touch panel;
wherein the first shielding layer is disposed between the touch panel and the sealant, or the first shielding layer is disposed on the side of the protection cover away from the touch panel for shielding internal lines on a frame of the touch display module.

2. The touch display device of claim 1, wherein the first shielding layer is disposed between the anti-glare film and the protection cover, and is formed on a surface of at least one of the anti-glare film and the protection cover.

3. The touch display device of claim 2, wherein the first shielding layer has a frame-like shape, and an orthographic projection of the sealant on the protection cover is within an area of an orthographic projection of the first shielding layer on the protection cover.

4. The touch display device of claim 1, wherein the first shielding layer is disposed on a surface of the anti-glare film away from the protection cover.

5. A method of manufacturing a touch display device, comprising:
providing a touch display module, a protection cover, and an ultraviolet curable adhesive, wherein the touch display module comprises a touch panel;
forming, by applying the ultraviolet curable adhesive to one of the touch panel and the protection cover, a frame-shaped ultraviolet curable adhesive, and bonding another one of the touch panel and the protection cover to the frame-shaped ultraviolet curable adhesive;
forming, by irradiating the frame-shaped ultraviolet curable adhesive from a side of the protection cover with ultraviolet light, a sealant under a vacuum condition, wherein a vacuum chamber is formed and enclosed by the sealant, the touch panel, and the protection cover, and the protection cover is recessed into the chamber from where the protection cover corresponds to the chamber; and
forming a first shielding layer on a side of the protection cover away from the touch panel to shield internal lines on a frame of the touch display module.

6. The method of manufacturing the touch display device of claim 5, wherein the forming a first shielding layer on a side of the protection cover away from the touch panel comprises a step as follows: forming the first shielding layer on a surface of the protection cover away from the touch panel.

7. The method of manufacturing the touch display device of claim 5, further comprising disposing an anti-glare film on the side of the protection cover away from the touch panel.

8. The method of manufacturing the touch display device of claim 7, wherein the forming a first shielding layer on a side of the protection cover away from the touch panel comprises a step as follows: forming the first shielding layer between the anti-glare film and the protection cover.

9. The method of manufacturing the touch display device of claim 8, wherein the first shielding layer has a frame-like shape, and an orthographic projection of the sealant on the protection cover is within an area of an orthographic projection of the first shielding layer on the protection cover.

10. The method of manufacturing the touch display device of claim 7, wherein the forming a first shielding layer on a side of the protection cover away from the touch panel comprises a step as follows: forming the first shielding layer on a surface of the anti-glare film away from the protection cover.

11. The method of manufacturing the touch display device of claim 5, further comprising disposing a first anti-rainbow stripes layer between the touch panel and the protection cover.

12. The method of manufacturing the touch display device of claim 11, further comprising disposing a second anti-rainbow stripes layer on the side of the protection cover away from the touch panel.

13. A touch display device, comprising:
a touch display module, a protection cover, a sealant, a first shielding layer, and a chamber, wherein the touch display module comprises a touch panel, the sealant is disposed between the touch panel and the protection cover for bonding the touch panel and the protection cover, and the chamber is enclosed by the sealant, the touch panel, and the protection cover, wherein the chamber is a vacuum chamber, and the protection cover is recessed into the chamber from where the protection cover corresponds to the chamber;
wherein the first shielding layer is disposed between the touch panel and the sealant, or the first shielding layer is disposed on a side of the protection cover away from the touch panel for shielding internal lines on a frame of the touch display module.

14. The touch display device of claim 13, further comprising a first anti-rainbow stripes layer disposed between the touch panel and the protection cover.

15. The touch display device of claim 14, wherein the first anti-rainbow stripes layer is disposed between the sealant and the touch panel, and the first shielding layer is disposed between the sealant and the first anti-rainbow stripes.

16. The touch display device of claim 15, further comprising a second anti-rainbow stripes layer disposed on the side of the protection cover away from the touch panel.

\* \* \* \* \*